US011930495B1

(12) United States Patent
Tian et al.

(10) Patent No.: US 11,930,495 B1
(45) Date of Patent: Mar. 12, 2024

(54) DOWNLINK SCHEDULING OPTIMIZATION FOR EDGE DEVICES THAT USE A RADIO COMMUNICATION PROTOCOL

(71) Applicant: Amazon Technologies, Inc., Seattle, WA (US)

(72) Inventors: Hongbo Tian, Fremont, CA (US); Rongsheng Huang, San Jose, CA (US); Jungtao Liu, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 60 days.

(21) Appl. No.: 17/218,597

(22) Filed: Mar. 31, 2021

(51) Int. Cl.
*H04W 72/1273* (2023.01)
*G16Y 30/00* (2020.01)

(52) U.S. Cl.
CPC ......... *H04W 72/1273* (2013.01); *G16Y 30/00* (2020.01)

(58) Field of Classification Search
CPC ........................... H04W 72/1273; G16Y 30/00
See application file for complete search history.

(56) References Cited

U.S. PATENT DOCUMENTS

| | | | |
|---|---|---|---|
| 10,681,607 B2 | 6/2020 | Shah et al. | |
| 2014/0155043 A1* | 6/2014 | Gell | H04L 67/02 455/414.1 |
| 2020/0107402 A1 | 4/2020 | Di Girolamo et al. | |
| 2021/0144517 A1* | 5/2021 | Guim Bernat | H04L 47/781 |
| 2022/0045907 A1* | 2/2022 | Szigeti | H04L 47/20 |
| 2022/0232600 A1* | 7/2022 | Kim | H04L 1/1812 |

* cited by examiner

*Primary Examiner* — Zhensheng Zhang
(74) *Attorney, Agent, or Firm* — Robert C. Kowert; Kowert, Hood, Munyon, Rankin & Goetzel, P.C.

(57) ABSTRACT

An IoT service of a provider network may be used to optimize downlink scheduling for edge devices that use a radio communication protocol (e.g., LoRaWAN). A processing instance receives DL packets from a client application that are to be sent to an edge device. The processing instance adds metadata entries (device ID, message ID) to a metadata queue and stores the DL packets into a data store. A scheduling instance obtains a metadata entry and the associated DL packet, formats the DL packet based on edge device information, and publishes the packet to a gateway topic. A separate connection instance receives the formatted DL packet and sends it to a gateway of the client network.

20 Claims, 10 Drawing Sheets

DOWNLINK SCHEDULING OPTIMIZATION FOR EDGE DEVICES THAT USE A RADIO COMMUNICATION PROTOCOL

BACKGROUND

The Internet of Things (IoT) is a phrase given for the interconnection of computing devices scattered around the globe within the existing internet infrastructure. Clients of a remote service provider may leverage the internet-based connectivity of IoT devices (also referred to herein as edge devices) by using a service offered by the service provider. For example, temperature sensors at a client site may collect temperature values for different equipment and transmit them to the service provider for analysis, such as determining whether a machine needs servicing.

A client's network may include edge devices that communicate wirelessly using a particular radio communication protocol. A service provider may provide a service that manages a large number of edge devices for clients. Due to a short time receiving window for some IoT devices, it may be challenging to provide the correct timing when downloading many different downlink (DL) messages to edge devices across client networks.

For example, a low-power wide-area network ("LoRaWAN") radio protocol specifies a narrow window of time for packet reception, which allows the IoT devices to use less power and conserve battery life. Due to these timing requirements, it may become difficult for a service provider to handles large quantities of DL messages, resulting in lost messages and reducing functionality of the IoT devices.

Figure 1:
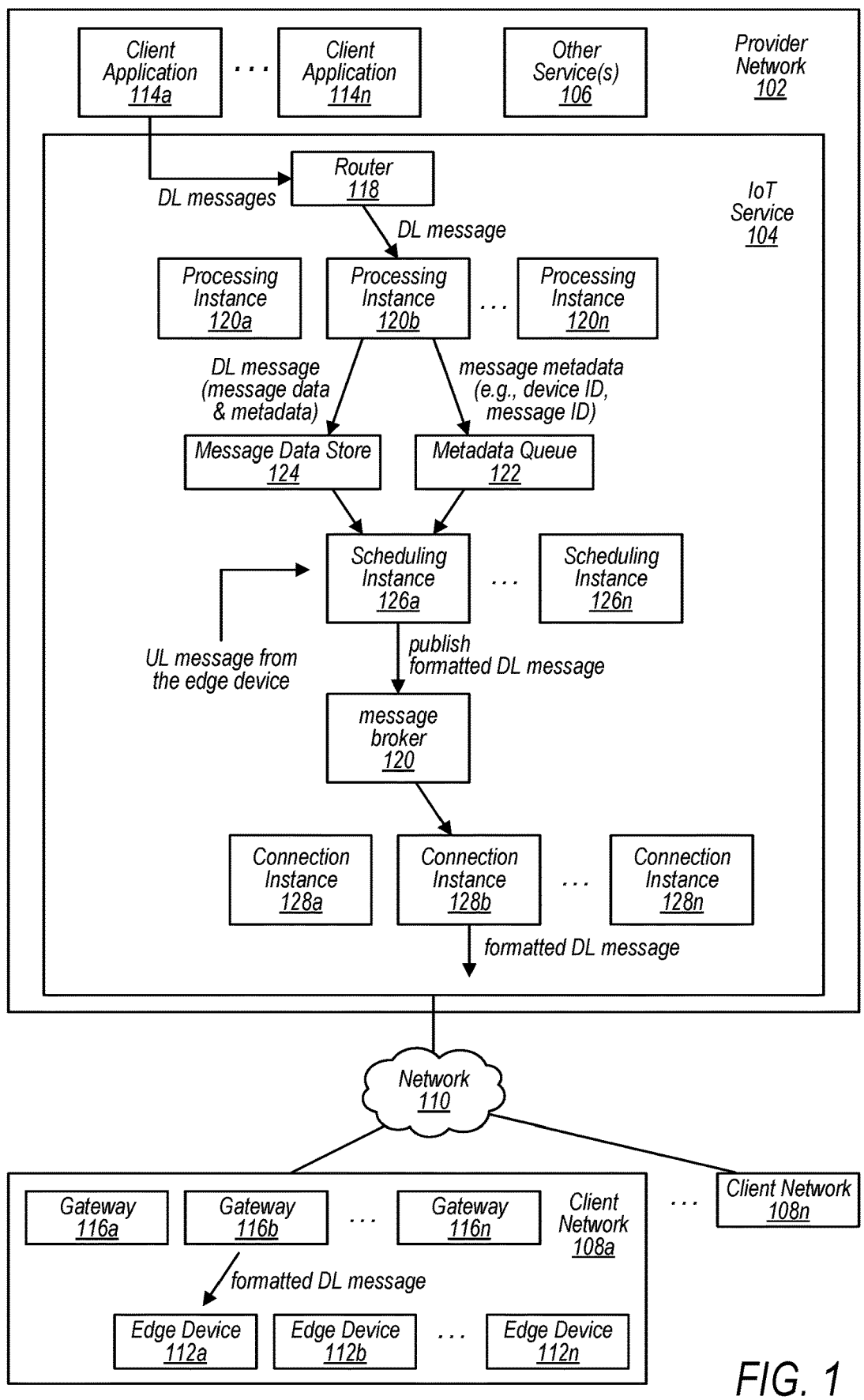
FIG. 1 is a logical block diagram illustrating a system for downlink scheduling optimization for edge devices that use a radio communication protocol, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments for downlink scheduling optimization for edge devices that use a radio communication protocol, according to some embodiments. In embodiments, for downlink scheduling optimization for edge devices that use a radio communication protocol may reduce the amount of messages (e.g., packets) that are lost due to scheduling disruptions/conflicts when a provider network manages a large number of IoT devices (e.g., "edge devices") of client networks, compared to traditional techniques.

In embodiments, an IoT service of a provider network may implement at least some or all of the functionality that local onsite servers would have performed according to traditional techniques. Traditionally, a company may have specified a group of local network servers (e.g., LoRaWAN network servers) as the core network for managing edge devices that use a radio communication protocol.

In some embodiments, the IoT service may be responsible to accept/reject join requests from edge device, authenticate/authorize edge devices' traffic, and manage any other aspects of the devices. Besides these responsibilities, the IoT service may also route the edge devices' traffic to destinations (e.g., a client-owned cloud application running at the provider network) or route traffic from the provider network to edge devices.

In embodiments, delivery of DL messages to edge devices may need to satisfy one or more requirements based on the radio protocol that is used by the edge device. For example, there may be a long delay in between receiving time windows and a short receiving time window due to the low duty cycle of power-saving edge devices. The edge device might open a very narrow time window for the DL message reception. Therefore, the scheduling of the DL messages may require certain timing information of the end edge devices. On the other hand, the large number of IoT end devices may impose a large load burden to the IoT service/provider network of the cloud. Embodiments may allow the IoT service to efficiently scale when scheduling messages. Otherwise, the heavy load can easily disrupt the scheduling of DL packets for IoT devices In addition to the above challenges, edge devices may connect to the cloud via gateways (e.g., gateway devices at the client network), which may maintain long-term (and often stateful) connections with the IoT service. In some embodiments, these gateways may not share connections with different connection instances. If there is a bottleneck, it may occur because of limited wireless resource/bandwidth of the gateway. Therefore, in embodiments, the scheduling of DL messages may include identifying the right connection instances to the gateways.

Another challenge of DL message scheduling involves the correlation of UL (uplink) messages. For many devices, such as LoRaWAN devices operating in Class A, the DL message timing is a fixed delay from the UL message's arrival. In some embodiments, the UL message sent up to the IoT service/application may need to be acknowledged by the next DL message that is sent to the edge device (e.g., by setting the ACK bit in the DL message).

Various embodiments may address timeliness and scalability challenges associated with DL scheduling. By separating the scheduling tasks (performed by processing/scheduling instances) from the connection tasks (performed by connection instances), the IoT service may utilize any information needed for scheduling the delivery of DL messages, without being affected by any restrictions/failures associated with the gateway connection.

In embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 8 and described below.

This specification begins with a description of a system for downlink scheduling optimization for edge devices that use a radio communication protocol. A number of different methods and techniques for downlink scheduling optimization for edge devices that use a radio communication protocol, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for downlink scheduling optimization for edge devices that use a radio communication protocol, according to some embodiments.

As shown, a provider network 102 includes an IoT service 104 that implements downlink scheduling optimization for edge devices that use a radio communication protocol. In the example embodiment, the provider network 102 may include any number of other services 106. For example, a service 106 may implement a client-owned application that receives data (e.g., packets/payload data) from client edge devices and/or sends data to client edge devices. In various embodiments, any described functionality of the IoT service may instead be implemented by one or more of the other services 106 (e.g., storing information for registered edge devices, device authentication/provisioning).

In the depicted embodiment, any number of clients of the IoT service 104 may use the IoT service 104 of the provider network 102 via communication between the IoT service 104 and a remote client network 108 of a client of the IoT service (e.g., via a wide area network 110, such as the internet). For example, a client may own/manage the client network 108a, which may include any number of edge devices 112 that send data to a client-owned application(s) 114 of the provider network 102 and/or receive data from client-owned application(s) via the IoT service 104. Similarly, any number of other clients may use the IoT service 104 with any number of other edge devices in the same or similar manner (e.g., using any number of edge devices 112 and/or gateways 116 of other client network(s)).

As shown, a client network may include any number of gateways 116 that allow for edge devices to communicate with the IoT service (e.g., via connection instances, as described below). For example, an edge device may transmit messages to a gateway according to a radio communication protocol (or "radio protocol") such as LoRaWAN, and those messages are forwarded on to the IoT service (e.g., via an a web socket/internet protocol).

In some embodiments, one or more of the gateways of a client network may be considered "private" because only edge devices of the client (e.g., owned/managed by client A) connect to the private gateways to communicate with the IoT service. In other words, a private gateway may be reserved for client edge devices of the client network to communicate with the provider network.

In embodiments, any number of other networks may be in communication with the provider network and/or client networks via the wide-area network 110. For example, one or more of the other networks may include one or more public gateways that allow edge devices (e.g., with roaming capability) of different clients to connect to communicate with the IoT service. In some embodiments, any of the client networks 108 may have also have one or more public gateways.

In the depicted embodiment embodiments, the IoT service 104 includes different components to perform tasks to optimize downlink scheduling for edge devices that use a radio communication protocol. In embodiments, optimization may include reducing or eliminating lost DL messages, conflicts, and/or any other disruption during transmission of large quantities of DL messages from the client application 114 to an edge device. In various embodiments, the IoT service may perform any number of other tasks to manage any number of edge devices for any of the clients of the IoT service (e.g., device registration, provisioning any number of instances, authentication, data routing).

As shown, the IoT service includes a router 118. The router may receive DL messages from a client application (e.g., client application 114a) and perform load balancing for the received messages in order to distribute messages among different processing instances 120 in order to more evenly distribute a load over time among any number of different instances. For example, the router/load balancer may select the processing instance 120b from among the processing instances 120 available to receive a group of DL messages (any number of messages/packets).

In embodiments, the selected processing instance (e.g., instance 120b) receives the DL messages that are to be sent to an edge device (e.g., edge device 112a) of a client network of the client via a gateway (e.g., gateway 116b) of the client network. In embodiments, each DL message includes information associated with the edge device. For example, a DL message may include a message ID that uniquely identifies the DL message with respect to the other DL messages, a device ID that uniquely identifies the edge device with respect to other edge devices at the client network (e.g., DevAddr for LoRaWAN), a transmission data rate used by the edge device, a type of radio communication protocol used by the edge device such as LoRaWAN, etc.).

As depicted, the processing instance may add an entry (metadata) for each of the DL messages to a metadata queue 122 (e.g., a single fifo queue) in an order (e.g., the order the DL messages were received from the application/router and/or an order of the messages to be sent to the edge device). An entry may include at least a portion of the information associated with the edge device (e.g., the DL message ID, the device ID, metadata indicating an order of the message in the sequence of messages). The processing instance may also store each of the DL messages to a message data store 124 (e.g., a database, volatile or non-volatile memory, etc.).

In the example embodiments, the IoT service may also include any number of scheduling instances 126. The scheduling instance 126a obtains (e.g., retrieves), from the queue in accordance with the order, an entry for one of the DL messages. Based on the entry (e.g., the message ID and/or the device ID), the scheduling instance 126a retrieves/obtains, from the data store 124, the DL message associated with the entry. For example, the scheduling instance 126a may retrieve the DL message based on a match of the message identifier within the DL message and the message identifier of the entry and/or based on a match of the device ID within the DL message with the device ID of the entry. In embodiments, groups of the DL messages in the message data store 124 are indexed by device ID of edge devices. By grouping multiple DL messages according to device ID, it may be faster for a scheduling instance to locate a DL message based on the device ID and message ID.

The scheduling instance 126a may then generate a formatted DL message based at least on the information associated with the edge device and the DL message. For example, the scheduling instance 126a may generate the formatted DL message in accordance with a LoRaWAN protocol/format (or other radio protocol) specified within the DL message. In embodiments, the scheduling instance 126a may include in the formatted DL message an acknowledgement (e.g., set an ACK bit) that a UL message was received from the edge device. In some embodiments, in response to the reception of the UL message, the scheduling instance 126a may include in the acknowledgement in the DL message and cause the formatted DL message to be sent to the connection instance after a predefined period of time and/or within a time window (e.g., in accordance with LoRaWAN protocol or other radio protocol).

In some embodiments, in order to cause the formatted DL message to be sent to the connection instance, the scheduling instance 126a may publish the formatted DL message to a gateway topic that is subscribed to by a connection instance 128 (e.g., connection instance 128b). As shown, the formatted DL message is sent to the message broker 130 when published, in accordance with a pub-sub protocol. The connection instance 128 receives the formatted DL message in accordance with the pub-sub protocol. In embodiments, the IoT service may include any number of connection instances 128, and each of those connection instances 128 may establish/maintain any number of connections with any number of corresponding client gateways 116.

In embodiments, a connection instance (e.g., connection instance 128b) may have a connection established with any number of gateways 116 of the client network. Therefore, the connection instance 128b may be subscribed to another gateway topic for another gateway (e.g., gateway 116n). The connection instance 128b may receive another formatted DL message that has been published to another gateway topic (for gateway 116n) in accordance with the pub-sub protocol.

The connection instance 128b may then send the other formatted DL message to the other gateway 116n via another connection with the gateway 116n. The formatted DL message may then be sent from the other gateway 116n to another edge device at the client network. In embodiments, the connections may be web socket connections and/or may be long-term connections (e.g., transmission control protocol/internet protocol (TCP/IP) connections).

Figure 2:
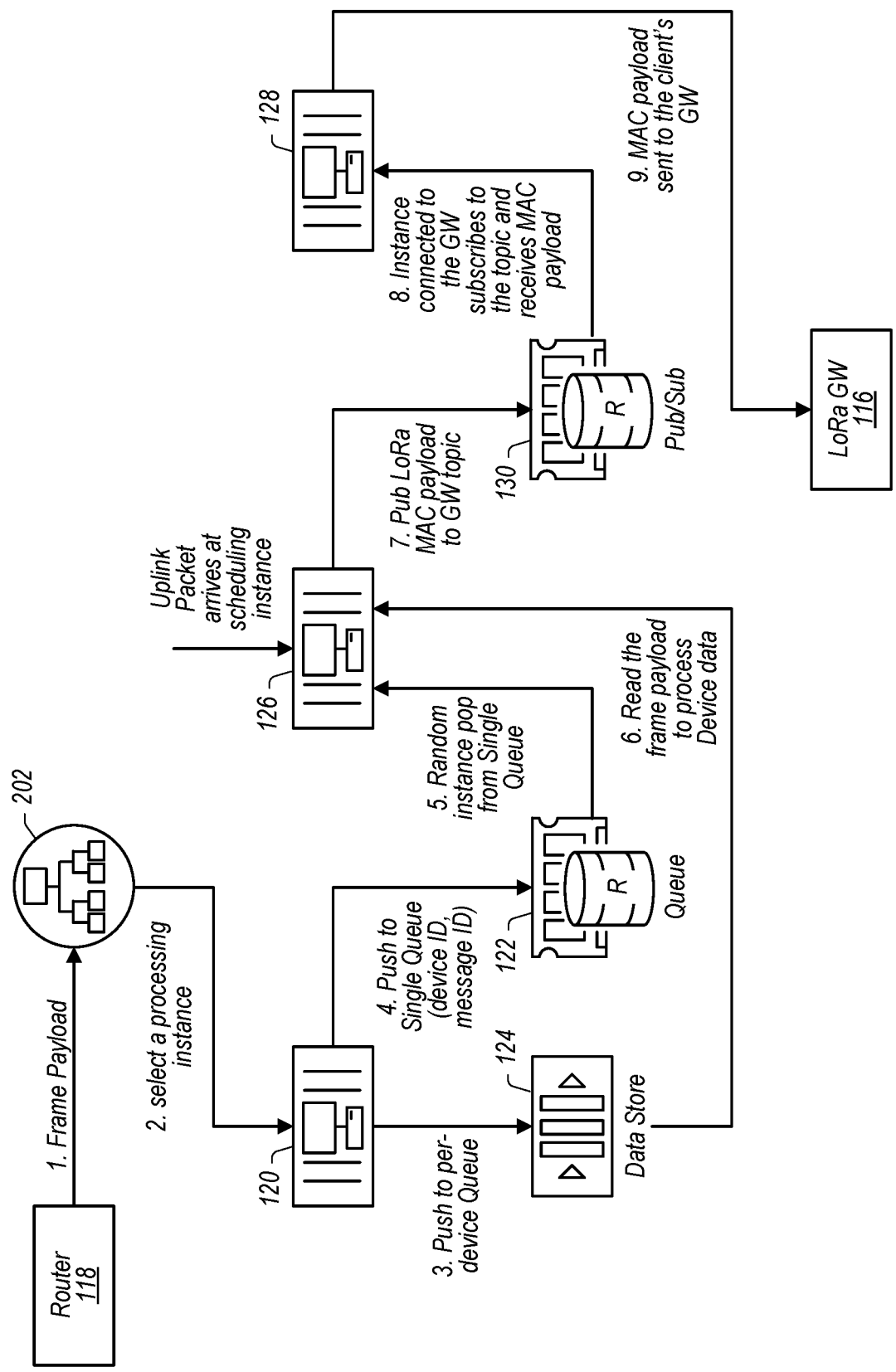
FIG. 2 is a block diagram illustrating a system for downlink scheduling optimization for edge devices that use a radio communication protocol, according to some embodiments.

FIG. 2 is a block diagram illustrating a system for downlink scheduling optimization for edge devices that use a radio communication protocol, according to some embodiments.

In the depicted embodiment, a load balancer 202 receives a frame payload (e.g., DL message/packet) from a router 118 and selects a processing instance 120 to send the frame payload to. The processing instance pushes the frame payload (or at least a portion of it) to a per-device queue (e.g., a data store 124 for the receiving edge device that stores the DL message in a fifo queue structure). The processing instance also pushes information associated with the receiving edge device into a single metadata queue 122 (e.g., device ID and/or message ID).

The scheduling instance 126 performs a random instance pop from the single queue to obtain/receive the next entry. Based on the entry, the scheduling instance 126 obtains/receives the frame payload corresponding to/referenced by the entry. The scheduling instance 126 may then process device data (e.g., information associated with the receiving edge device stored in the frame payload and/or the entry) in order to format the frame payload.

As shown, the scheduling instance 126 may receive an UL packet (e.g., UL message) from the receiving edge device and include an acknowledgment indication for the uplink packet as part of the formatting. The scheduling instance 126 may schedule the sending of the formatted frame payload based on the time that the scheduling instance 126 received the UL packet.

The scheduling instance 126 may publish the formatted frame payload (e.g., the LoRa MAC payload) to a gateway topic (e.g., the topic subscribed to by the connection instance 128). As shown, the connection instance 128 may receive the formatted frame payload from the pub/sub broker and send it to the client's gateway. The gateway may then transmit the formatted frame payload to the edge device (e.g., according to the LoRaWAN communication protocol).

Figure 3:
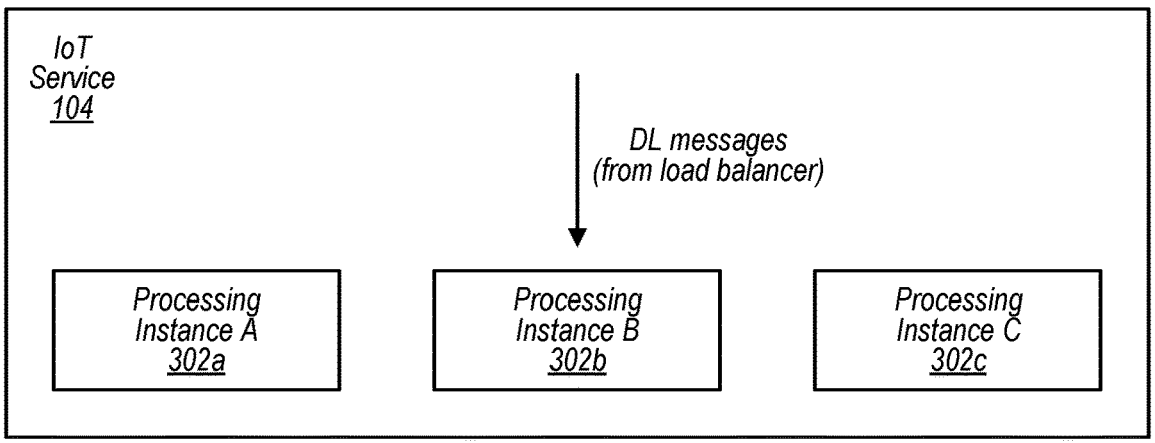
FIG. 3 illustrates failure of a processing instance and continued operation of the other processing instances, according to some embodiments.
Figure 3:
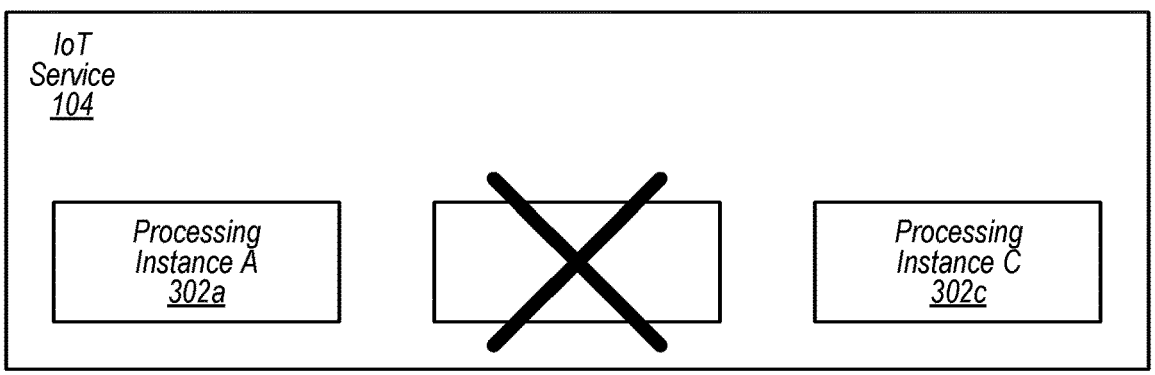
Figure 3:
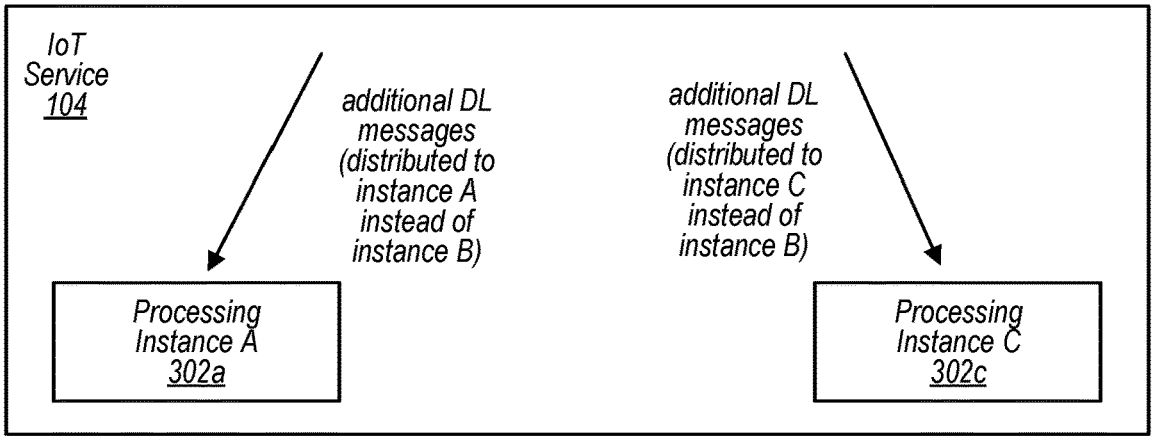

FIG. 3 illustrates failure of a processing instance and continued operation of the other processing instances, according to some embodiments.

As shown, the IoT service may include processing instances A 302a, B 302b, and C 302c that receive DL messages distributed from a load balancer. At a later point in time, connection instance B fails. In response to detecting, by the IoT service, that processing instance B has failed, to the IoT service may update the pool of processing instances (e.g., data that indicates each of the available processing instances) that are available for the load balancer to distribute DL messages to. The load balancer may distribute additional DL messages from the client application across the remaining processing instances.

Figure 4:
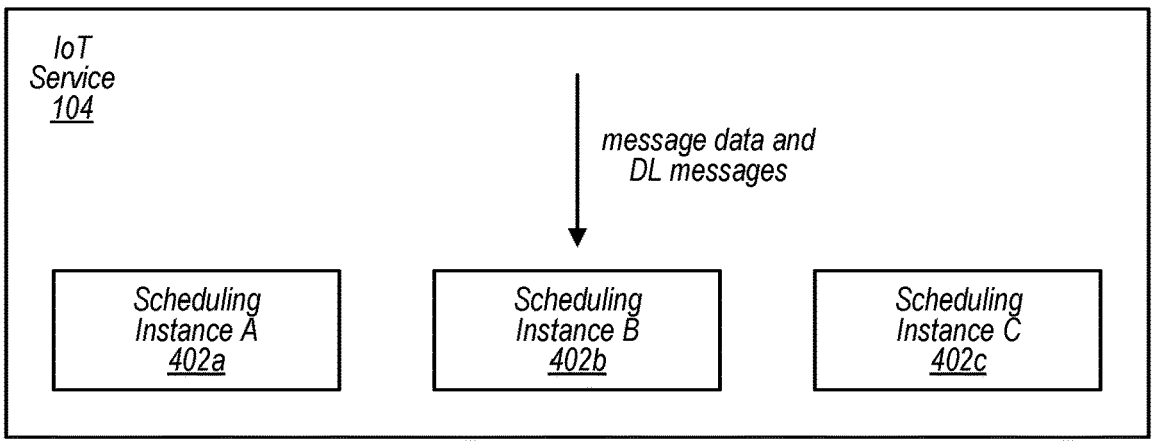
FIG. 4 illustrates failure of a scheduling instance and continued operation of the other scheduling instances, according to some embodiments.
Figure 4:
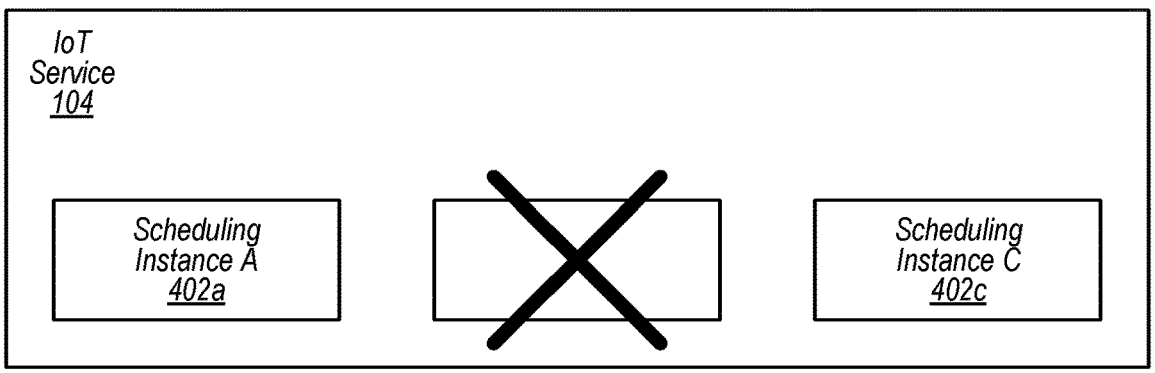
Figure 4:
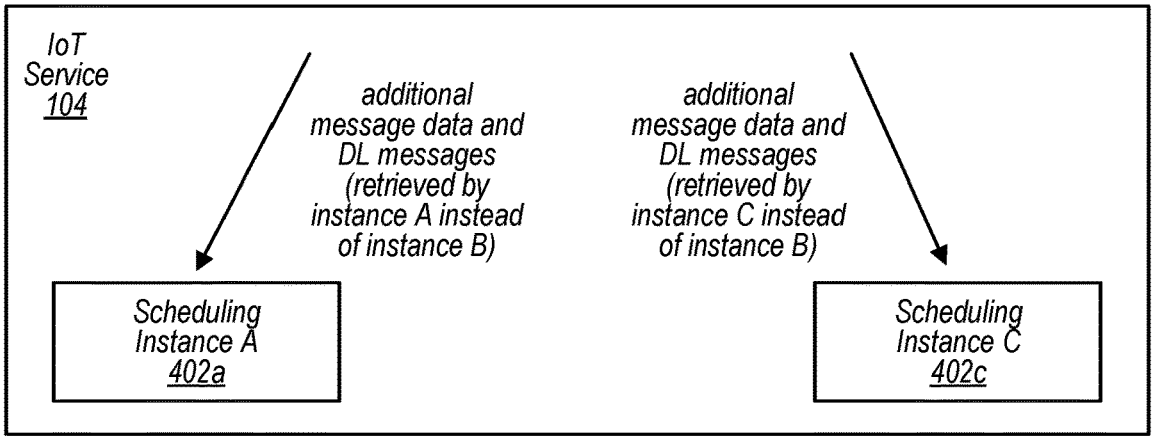

FIG. 4 illustrates failure of a scheduling instance and continued operation of the other scheduling instances, according to some embodiments.

As shown, scheduling instances A 402a, B 402b, and C 402c retrieve DL messages and metadata as described herein. As depicted, the scheduling instance B fails. After the failure, the remaining scheduling instances (402a and 402c) retrieve additional DL messages and additional metadata. Therefore, the scheduling load is distributed among the remaining scheduling instances. In various embodiments, after detection of the failure of any particular type of instance (e.g., processing, scheduling, connection), the IoT service may instantiate/configure one or more new instances to replace it. In embodiments, the IoT service may scale the service up or down by adding or removing any number/type of instances (e.g., depending on the whether the message load increases or decreases and by how much).

Figure 5:
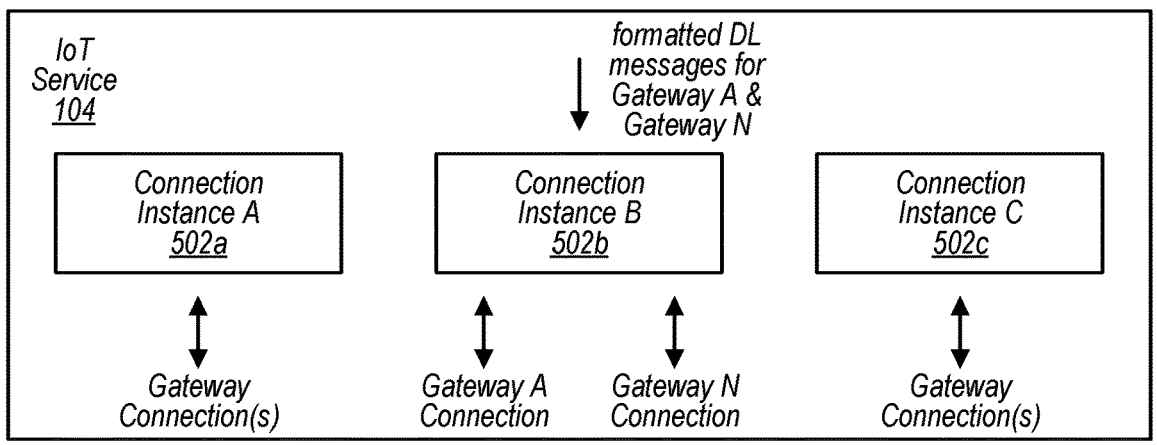
FIG. 5 illustrates failure of a connection instance and re-establishment of gateway connections with other connection instances, according to some embodiments.
Figure 5:
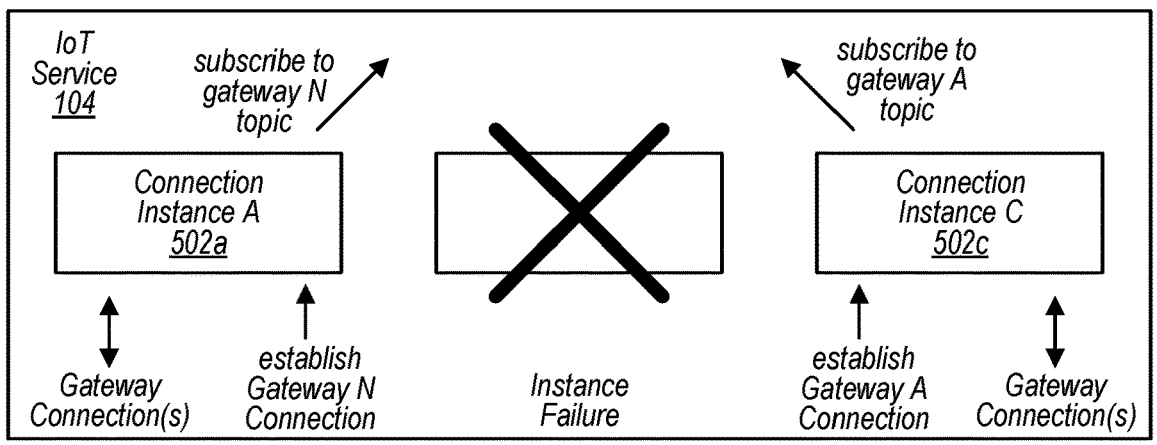
Figure 5:
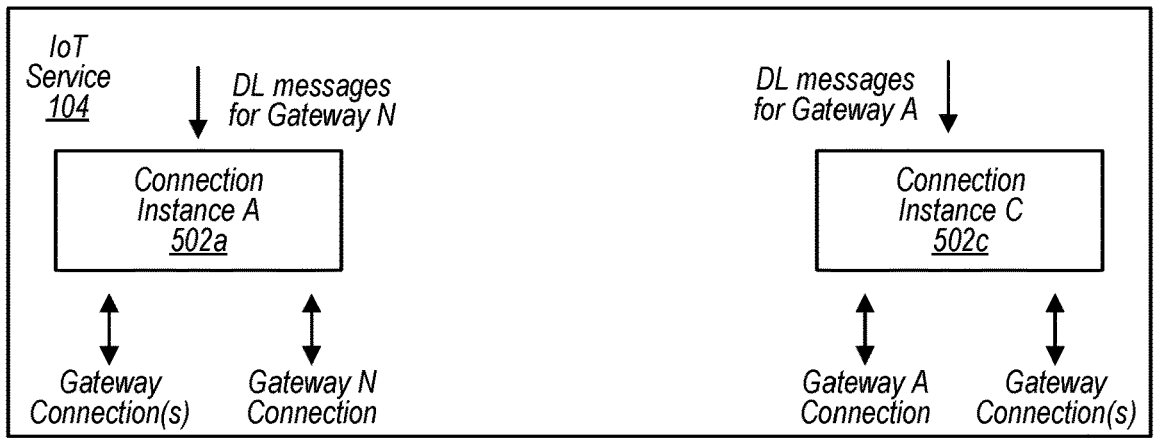

FIG. 5 illustrates failure of a connection instance and re-establishment of gateway connections with other connection instances, according to some embodiments.

As shown, connection instances A 502a, B 502b, and C 502c receive formatted DL messages for gateway A and gateway N and sends them on to gateway A and gateway N (using a connection to gateway A and a connection to gateway N, as described herein). As depicted, the connection instance B fails. The service detects the failure of the connection instance.

In response to detection of the failed instance B, the service assigns gateway N to connection instance A and gateway A to connection instance C. Connection instance A re-establishes a connection with gateway N and connection instance C re-establishes a connection with gateway A. Connection instance A subscribes to the gateway N topic and connection instance C subscribes to the gateway A topic. DL messages and UL messages for gateways A and N may then be routed using the connection instances C and A. As shown, connection instances C and A may have any other number of connections with other gateways during this process.

Although the example embodiment shows re-establishment of two connections, in various embodiments, any number of connections of a failed instance may be re-established in any manner using any number of other connection instances. For example, instance A may re-establish 10 connections, instance C may re-establish 100 connections, and another instance may re-establish 50 connections.

Figure 6:
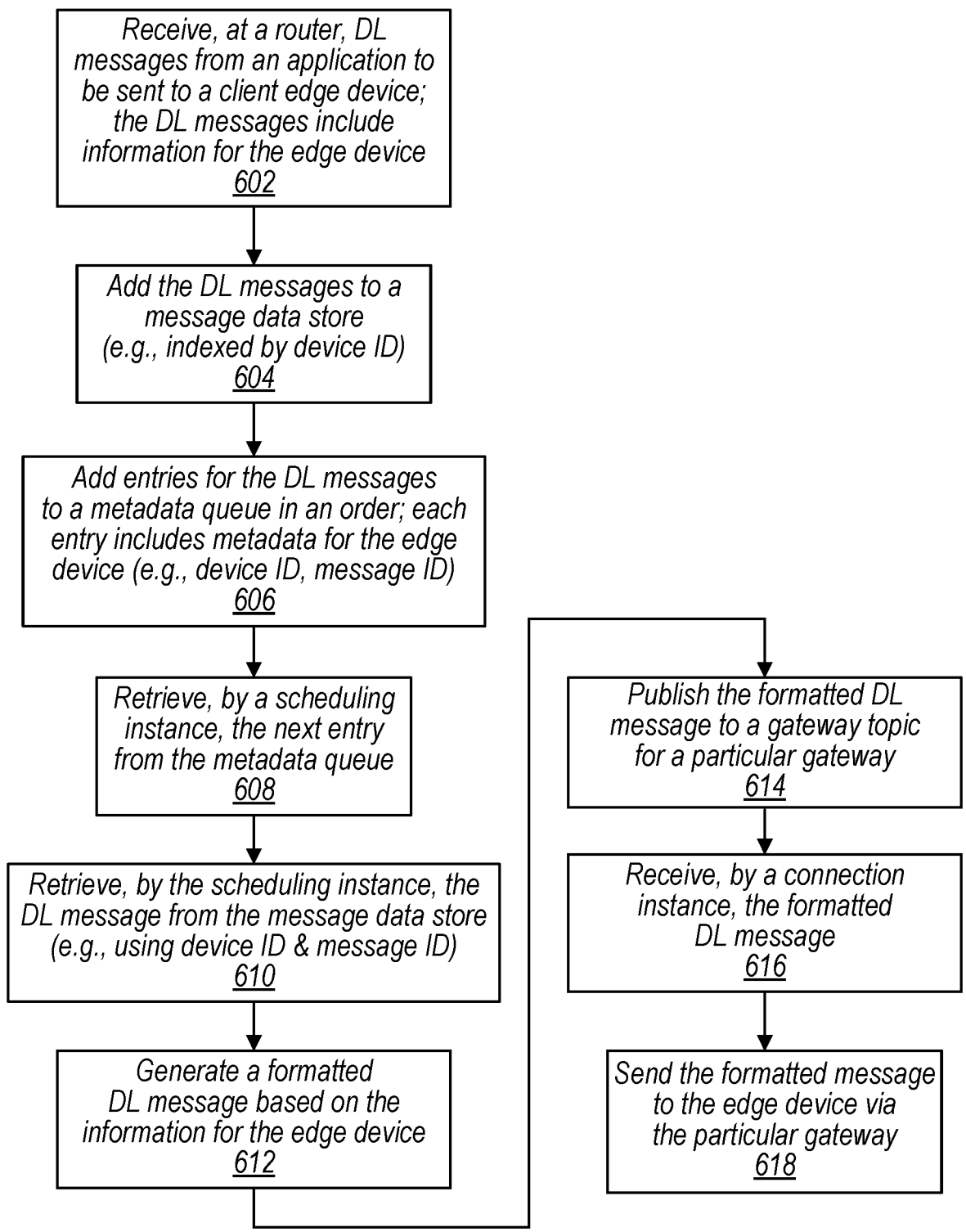
FIG. 6 is a high-level flowchart illustrating various methods and techniques for downlink scheduling optimization for edge devices that use a radio communication protocol, according to some embodiments.

FIG. 6 is a high-level flowchart illustrating various methods and techniques for downlink scheduling optimization for edge devices that use a radio communication protocol, according to some embodiments. In various embodiments, any of the functionality described for any portions of the flowcharts 6-9 may be performed by any of the components of FIGS. 1-5 and/or 10.

Figure 7:
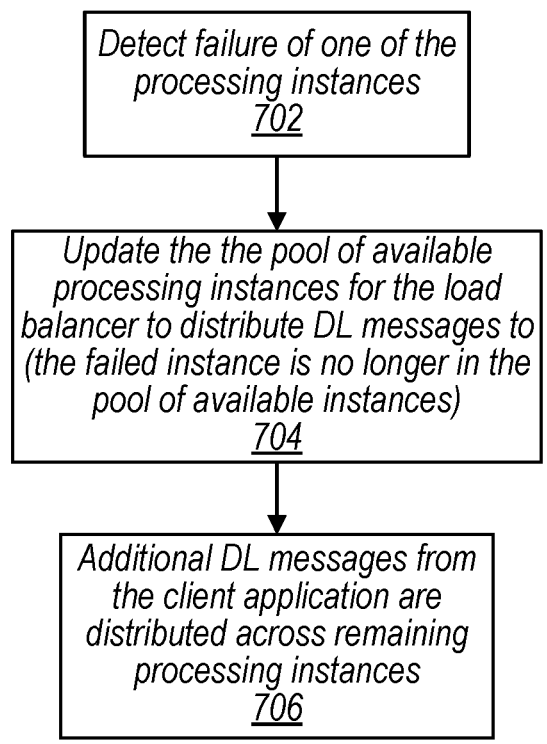
FIG. 7 is a high-level flowchart illustrating various methods and techniques to handle failure of a processing instance and continue operation of the other processing instances, according to some embodiments.
Figure 8:
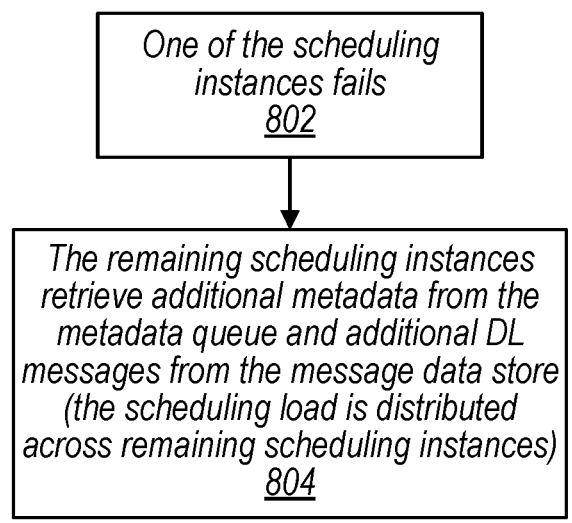
FIG. 8 is a high-level flowchart illustrating various methods and techniques to handle failure of a scheduling instance and continued operation of the other scheduling instances, according to some embodiments.
Figure 9:
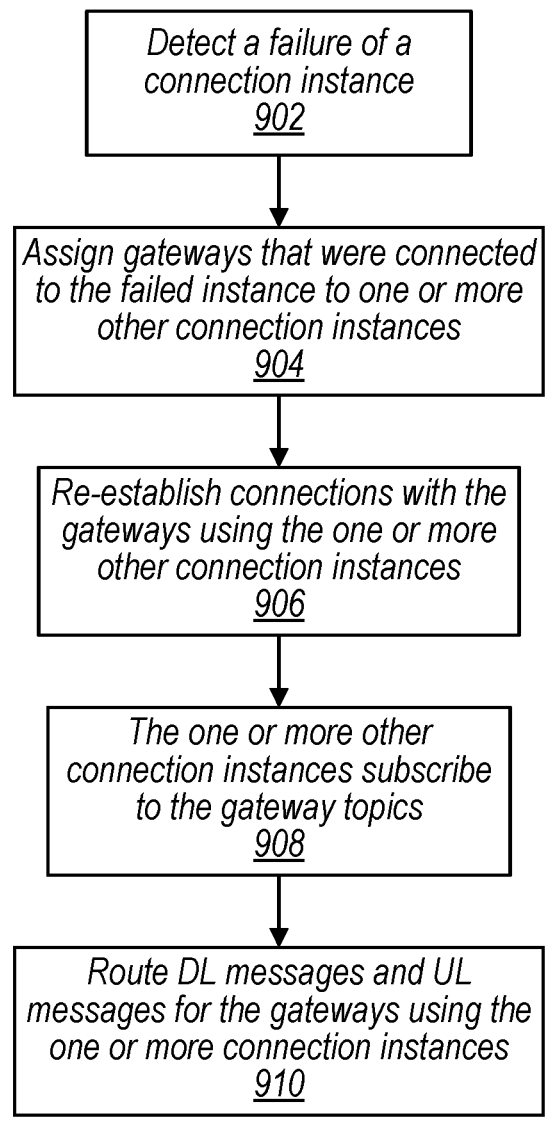
FIG. 9 is a high-level flowchart illustrating various methods and techniques to handle failure of a connection instance and to re-establish gateway connections with other connection instances, according to some embodiments

These techniques, as well as the techniques discussed with regard to FIGS. 7-9, may be implemented using components or systems as described above with regard to FIGS. 1-5, as well as other types of components or systems, and thus the following discussion is not intended to be limiting as to the other types of systems that may implement the described techniques. For example, any of the techniques may be implemented by one or more services of a provider network and/or a local service/application of a client network.

At block 602, the IoT service receives, at a router, DL messages from an application that are to be sent to a client edge device. The DL messages may include information for the edge device (e.g., device ID) and/or for the messages themselves (e.g., message ID, sequence number). At block 604, the IoT service adds the DL messages to a message data store. Each DL message may include any type of information for the edge device. In embodiments, the DL messages are indexed by device ID. At block 606, the IoT service adds entries for the DL messages to a metadata queue in an order (e.g., fifo queue). Each entry may include metadata for the edge device (e.g., device ID, message ID).

At block 608, a scheduling instance retrieves the next entry from the metadata queue. At block 610, the scheduling instance retrieves the corresponding/matching DL instance from the message data store (e.g., using the device ID and/or the message ID).

At block 612, the scheduling instance generates a formatted DL message based on the DL message and the information for the edge device. At block 614, the scheduling instance publishes the formatted DL message to a gateway topic for a particular gateway of the client network. At block 616, the connection instance receives the formatted DL message (e.g., based on a subscription to the topic). At block 618, the connection instance sends the formatted DL message to the edge device via the particular gateway, where it is transmitted to the edge device.

FIG. 7 is a high-level flowchart illustrating various methods and techniques to handle failure of a processing instance and continue operation of the other processing instances, according to some embodiments.

At block 702, the IoT service detects a failure of a processing instance. At block 704, the IoT service updates the pool of available processing instances for the load balancer to distribute DL messages to. The failed instance may no longer be in the pool of available instances. At block 706, additional DL messages from the client application are distributed across the remaining processing instances.

FIG. 8 is a high-level flowchart illustrating various methods and techniques to handle failure of a scheduling instance and continued operation of the other scheduling instances, according to some embodiments.

At block 802, one of the scheduling instances fails. At block 304, the remaining scheduling instances retrieve additional metadata from the metadata queue and retrieve additional DL messages from the message data store. The scheduling load may be distributed across the remaining scheduling instances.

FIG. 9 is a high-level flowchart illustrating various methods and techniques to handle failure of a connection instance and to re-establish gateway connections with other connection instances, according to some embodiments.

At block 902, the IoT service detects failure of a connection instance. At block 904, the service assigns gateways that were connected to the failed instance to one or more other connection instances. At block 906, the service re-establishes connections with the gateways using the one or more other connection instances. At block 908, the one or more other connection instances subscribe to the gateway topics for the gateways. At block 910, the connections instances route DL messages and UL messages for the gateways.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of the IoT service and any other components that implement the techniques described herein). The various methods as illustrated in the figures and described herein represent example embodiments of methods. The order of any method may be changed, and various elements may be added, reordered, combined, omitted, modified, etc.

Figure 10:
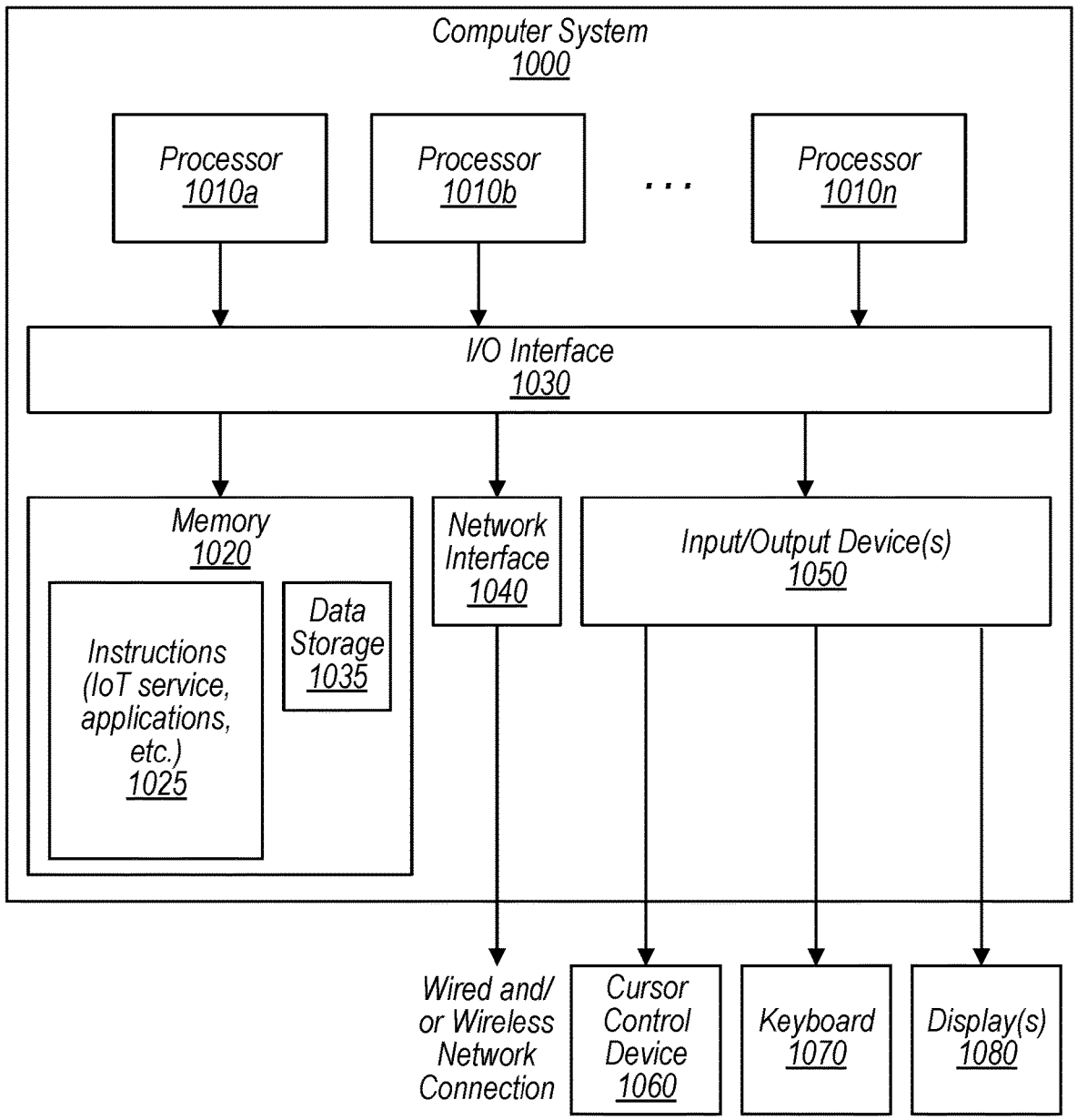
FIG. 10 is a block diagram illustrating an example computing system, according to some embodiments.

Embodiments to implement downlink scheduling optimization for edge devices that use a radio communication protocol, which may interact with various other systems or devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) may include standard computer monitor(s) and/or other display systems, technologies or devices, in one embodiment. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in one embodiment. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1020 may store program instructions 1025 and/or data accessible by processor 1010, in one embodiment. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., IoT service and any other components) are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in one embodiment.

In one embodiment, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in one embodiment. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in one embodiment. Multiple input/output devices 1050 may be present in computer system 1000 or may be distributed on various nodes of computer system 1000, in one embodiment. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025 that implement the various embodiments of the systems as described herein, and data store 1035, comprising various data accessible by program instructions 1025, in one embodiment. In one embodiment, program instructions 1025 may include software elements of embodiments as described herein and as illustrated in the Figures.

Data storage 1035 may include data that may be used in embodiments (e.g., mappings, device identifiers, messages, etc.). In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   one or more processors and one or more memories of a provider network, wherein the one or more memories have stored thereon instructions, which when executed by the one or more processors, cause the one or more processors to implement an IoT service of the provider network for a plurality of clients of the provider network, wherein the IoT service is configured to:
   provision a plurality of processing instances, wherein a processing instance of the plurality of processing instances is configured to:
   receive, from an application of the provider network, a plurality of downlink (DL) messages to be sent to an edge device of a client network of a client via a gateway of the client network, wherein the plurality of DL messages comprise information associated with the edge device;
   add a plurality of entries for the plurality of DL messages to a queue of the IoT service of the provider network in an order, wherein the plurality of entries comprise at least a portion of the information associated with the edge device; and
   store the plurality of DL messages to a data store, wherein a particular DL message of the plurality of DL messages indicates a device ID for the edge device;
   provision a plurality of scheduling instances, wherein a scheduling instance of the plurality of scheduling instances is configured to:
   obtain, from the queue of the IoT service of the provider network in accordance with the order, an entry for the particular DL message of the plurality of DL messages to be sent from the IoT service of the provider network to the edge device of the client network of the client via the gateway of the client network;
   based at least on a message ID of the entry for the particular DL message, obtain, from the data store, the particular DL message, wherein the data store also comprises other DL messages that are to be sent to a different edge device that uses a different communication protocol than the edge device;
   based on information within the particular DL message that specifies a particular communication protocol that is used by the edge device of the client network, generate, by the scheduling instance of the IoT service of the provider network, a formatted DL message that is formatted in accordance with the particular communication protocol; and
   cause the formatted DL message to be sent to a connection instance, wherein the connection instance has a connection with the gateway of the client network; and
   provision a plurality of connection instances, wherein the connection instance of the plurality of connection instances is configured to:

maintain the connection with the gateway of the client network;
receive the formatted DL message; and
send the formatted DL message to the gateway of the client network via the connection.

2. The system as recited in claim 1, wherein the scheduling instance is further configured to:
receive an uplink (UL) message from the edge device; and
in response to the reception of the UL message, cause the formatted DL message to be sent to the connection instance after a predefined period of time.

3. The system as recited in claim 2, wherein to generate the formatted DL message, the scheduling instance is further configured to:
include in the formatted DL message an acknowledgement that the UL message was received.

4. The system as recited in claim 1, wherein to cause the formatted DL message to be sent to the connection instance, the scheduling instance is further configured to:
publish the formatted DL message to a gateway topic, wherein the connection instance is subscribed to the gateway topic.

5. The system as recited in claim 1, wherein to generate the formatted DL message, the scheduling instance is further configured to:
generate the formatted DL message in accordance with a low-power wide-area network (LoRaWAN) protocol.

6. A method, comprising:
performing, by one or more computing devices of a provider network:
obtaining, from a queue by a scheduling instance of an IoT service of the provider network, message data for a particular downlink (DL) message of a plurality of DL messages to be sent from the IoT service of the provider network to an edge device of a client network of a client via a gateway of the client network, wherein the plurality of DL messages are from an application of the provider network, and wherein the message data for the particular DL message identifies the particular DL message;
based at least on a message ID of the message data for the particular DL message, obtaining, from a data store by the scheduling instance, the particular DL message, wherein the particular DL message comprises information associated with the edge device, and wherein the data store also comprises other DL messages that are to be sent to a different edge device that uses a different communication protocol than the edge device;
based on information within the particular DL message that specifies a particular communication protocol that is used by the edge device of the client network, generating, by the scheduling instance of the IoT service of the provider network, by the scheduling instance, a formatted DL message that is formatted in accordance with the communication protocol;
causing, by the scheduling instance, the formatted DL message to be sent to a connection instance of the IoT service, wherein the connection instance has a connection with the gateway of the client network;
receiving, by the connection instance, the formatted DL message; and
sending, by the connection instance, the formatted DL message to the gateway of the client network via the connection.

7. The method as recited in claim 6, further comprising:
receiving, by the scheduling instance, an uplink (UL) message from the edge device; and
in response to receiving the UL message, causing, by the scheduling instance, the formatted DL message to be sent to the connection instance after a predefined period of time.

8. The method as recited in claim 7, wherein generating the formatted DL message comprises:
including in the formatted DL message an acknowledgement that the UL message was received.

9. The method as recited in claim 6, wherein causing the formatted DL message to be sent to the connection instance comprises:
publishing the formatted DL message to a gateway topic, wherein the connection instance is subscribed to the gateway topic.

10. The method as recited in claim 9, wherein the connection instance has another connection with another gateway of the client network, wherein the connection instance is subscribed to another gateway topic associated with another gateway, and further comprising:
receiving, by the connection instance, another formatted DL message that has been published to the other gateway topic; and
sending, by the connection instance, the other formatted DL message to the other gateway of the client network via the other connection.

11. The method as recited in claim 9, further comprising:
determining, by the IoT service, that the connection instance has failed;
in response to determining that the connection instance has failed, re-establishing the connection with the gateway using another connection instance; and
subscribing, by the other connection instance, to the gateway topic.

12. The method as recited in claim 6, further comprising:
receiving, by a processing instance from the application, the plurality of DL messages;
adding, by the processing instance, the message data for the DL messages to the queue; and
adding, by the processing instance, the DL messages to the data store.

13. The method as recited in claim 12, further comprising:
selecting, by a load balancer, the processing instance from among a plurality of processing instances available to receive the plurality of DL messages; and
sending, from the load balancer to the processing instance, the plurality of DL messages.

14. The method as recited in claim 6, wherein generating, by the scheduling instance, the formatted DL message comprises:
generating the formatted DL message in accordance with a low-power wide-area network (LoRaWAN) protocol.

15. One or more non-transitory computer-accessible storage media storing program instructions that when executed on or across one or more processors of a provider network cause the one or more processors to:
obtain, by a scheduling instance of an IoT service of the provider network, message data for a particular downlink (DL) message of a plurality of DL messages to be sent from the IoT service of the provider network to an edge device of a client network of a client via a gateway of the client network, wherein the plurality of DL messages are from an application of the provider network, and wherein the message data for the particular DL message identifies the particular DL message;

based at least on a message ID of the message data for the particular DL message, obtain, by the scheduling instance, the particular DL message, wherein the particular DL message comprises information associated with the edge device, and wherein the data store also comprises other DL messages that are to be sent to a different edge device that uses a different communication protocol than the edge device;

based on information within the particular DL message that specifies a particular communication protocol that is used by the edge device of the client network, generate, by the scheduling instance of the IoT service of the provider network, a formatted DL message that is formatted in accordance with the communication protocol;

cause, by the scheduling instance, the formatted DL message to be sent to a connection instance of the IoT service, wherein the connection instance has a connection with the gateway of the client network; and receive, by the connection instance, the formatted DL message; and send, by the connection instance, the formatted DL message to the gateway of the client network via the connection.

16. The one or more storage media as recited in claim 15, wherein the program instructions when executed on or across the one or more processors further cause the one or more processors to:

receive, by the scheduling instance, an uplink (UL) message from the edge device; and in response to the reception of the UL message, cause, by the scheduling instance, the formatted DL message to be sent to the connection instance after a predefined period of time.

17. The one or more storage media as recited in claim 16, wherein to generate the formatted DL message, the program instructions when executed on or across the one or more processors further cause the one or more processors to:

include in the formatted DL message an acknowledgement that the UL message was received.

18. The one or more storage media as recited in claim 15, wherein to cause the formatted DL message to be sent to the connection instance, the program instructions when executed on or across the one or more processors further cause the one or more processors to:

publish the formatted DL message to a gateway topic, wherein the connection instance is subscribed to the gateway topic.

19. The one or more storage media as recited in claim 15, wherein the program instructions when executed on or across the one or more processors further cause the one or more processors to:

receive, from the application by one of a plurality of available processing instances, the plurality of DL messages;

add, by the processing instance, the message data for the DL messages to a queue; and add, by the processing instance, the DL messages to a data store;

in response to detection of failure of the processing instance, distribute a plurality of additional DL messages to other processing instances of the plurality of available processing instances, wherein the plurality of available processing instances no longer includes the failed processing instance.

20. The one or more storage media as recited in claim 15, wherein to generate, by the scheduling instance, the formatted DL message, the program instructions when executed on or across the one or more processors further cause the one or more processors to:

generate the formatted DL message in accordance with a low-power wide-area network (LoRaWAN) protocol.

* * * * *